United States Patent [19]

Sutter

[11] 3,946,984
[45] Mar. 30, 1976

[54] MOTOR-DRIVEN CONTROL DEVICE FOR A VALVE ROD

[75] Inventor: Jean Georges Sutter, Villers-les-Nancy, France

[73] Assignee: Pont-a-Mousson S.A., Pont-a-Mousson, France

[22] Filed: June 15, 1973

[21] Appl. No.: 370,261

[30] Foreign Application Priority Data
June 19, 1972   France .............................. 72.22078
Nov. 8, 1072   France .............................. 72.39455
Apr. 25, 1973   France .............................. 73.14916

[52] U.S. Cl. ................ 251/130; 251/133; 251/136
[51] Int. Cl.² ........................................ F16K 31/05
[58] Field of Search .......... 251/133, 134, 135, 136, 251/130; 310/162, 163

[56] References Cited
UNITED STATES PATENTS

| | | | |
|---|---|---|---|
| 2,860,266 | 11/1958 | Schrader | 251/133 X |
| 2,956,188 | 10/1960 | White | 251/133 X |
| 2,992,807 | 7/1961 | Karlby et al. | 251/134 X |
| 3,153,161 | 10/1964 | Gabriel | 310/162 |
| 3,166,686 | 1/1965 | Mea | 310/162 X |
| 3,561,724 | 2/1971 | Trombetta | 251/130 |

FOREIGN PATENTS OR APPLICATIONS 1,142,557   2/1969   United Kingdom ................ 251/130

Primary Examiner—Arnold Rosenthal
Attorney, Agent, or Firm—Sughrue, Rothwell, Mion, Zinn and Macpeak

[57] ABSTRACT

Control device for the actuating rod of the closure member of a valve of the type having an electric motor for driving the actuating rod.

The electric motor is a variable reluctance electric motor whose stator is fixed to the frame of the valve and whose rotor is coaxial with and connected to rotate with the actuating rod.

10 Claims, 14 Drawing Figures

FIG_2

FIG_1

MOTOR-DRIVEN CONTROL DEVICE FOR A VALVE ROD

The present invention relates to a motor-driven control device for a valve control rod.

Known control devices of the electromechanical type for gates or gate valves have a motor-speed reducer unit. They indeed comprise d.c. or a.c. electric motors which rotate at high speeds and therefore require a speed reducer. The speed reducer is also essential in these devices owing to the fact that it also serves as a torque multiplier as there is a need for a low speed and a high torque, in particular when opening the gate valve.

Now, the speed reducer increases the overall size of the motor and increases the play in the transmission system and thus decreases the precision which is already low owing to the high inertia of the motor and the stopping position of the closure member. Moreover, with a motor having a commutator, the latter requires frequent maintenance in order to keep the commutator clean.

An object of the present invention is to provide a device which overcomes these drawbacks in that it eliminates the speed reducer.

The invention provides a control device for an actuating rod of a valve of the type comprising an electric motor, wherein the electric motor is a motor having a variable reluctance whose stator is secured to the frame of the valve and whose rotor is connected to rotate with the actuating rod and is coaxial with the latter.

The invention therefore constitutes a new application of a motor of known type to the control of a valve actuating rod.

By means of this device, a high torque is exerted on the actuating rod within a very small space since the rotor may be directly fixed to the actuating rod of the closure member and arranged coaxial with the rod.

In particularly advantageous embodiments, there are provided a manual operating wheel, means for coupling the wheel with the actuating rod, means for automatically locking the coupling means when changing to manual control and automatically unlocking the coupling means when the electric motor is supplied with current.

In one of these embodiments, the means for coupling the wheel with the rod comprise a coupling of the wheel with the rotor of the motor and their locking means comprise resiliently yieldable means which axially displace the rotor in opposition to the electromagnetic return force of the rotor with respect to the stator which exists when the latter is supplied with current.

In another of these embodiments which is still more simple and consequently cheaper and stronger, the device comprises means for automatically releasing the locking means and comprising a magnetic core integral with the stator of the motor and a magnetic armature disposed with respect to the core in such manner that it is attracted by the core and moves the locking means between their locking and unlocking positions when current is supplied to the stator.

Also, advantageously, the device further comprises means for braking the actuating rod and means for automatically applying the braking means when the motor is put out of action and automatically releasing the braking means when the motor is brought into action. Thus, in the case where the closure member of the valve carried by the actuating rod is a closure member subjected to a dynamic force of the fluid, for example a butterfly valve or other pivoting valve, when the motor is inoperative, the closure member is locked in the desired position and there is no danger of its departing from the latter under the action of the torque exerted by the fluid flowing through the valve.

When the manual actuating wheel is not permanently fixed to the actuating rod, which is for example the case of the particular embodiments mentioned hereinbefore, the means for automatically applying and releasing the braking means may be constituted by means for, on one hand, automatically applying the braking means when putting the manual control and the electric motor simultaneously out of action and, on the other hand, automatically releasing these braking means when at least one of the manual control and electric motor control is brought into action.

When, moreover, as is the case in the second particular embodiment mentioned hereinbefore, the wheel is slidably mounted relative to the actuating rod and can be coupled therewith by dogs in opposition to the action of a spring, the means for automatically applying and releasing the braking means may comprise thrust means connected to move with the wheel and capable, when the wheel is rendered integral with the rod, of moving the braking means between their applied and released positions in opposition to elastically yieldable means for returning the braking means to their applied position. With this arrangement, the axial thrust on the actuating wheel, whose purpose is to couple the wheel with the rod by interengaging dogs and lock it in this position, also has for effect to release the braking means and release the actuating rod.

Preferably, the means for automatically applying and releasing the braking means may comprise a magnetic core integral with the stator of the motor and a magnetic armature which is disposed with respect to this core in such manner as to be capable of being attracted by the latter and shifting the braking means between their applied and released positions when current is supplied to the stator, in opposition to elastically yieldable means for returning them to their applied position.

This arrangement is particularly advantageously provided when, for example in the case of the aforementioned second particular embodiment, the device has means for automatically releasing locking means already comprising a magnetic core integral with the stator of the motor and a magnetic armature so located with respect to the core as to be capable of being attracted thereto and displacing the locking means between their locking and unlocking positions when current is supplied to the stator. Thus the magnetic armature already employed for unlocking the manual control when the electric motor is supplied with current is simultaneously employed for releasing the braking means when current is supplied to the motor. In other words, the effect of the reluctance of the motor is also employed for releasing the means for braking the actuating rod of the closure member.

Another object of the invention is to provide a gate valve provided with a control device of the aforementioned type.

Further features and advantages of the invention will be apparent from the ensuing description with reference to the accompanying drawings.

Figure 1:
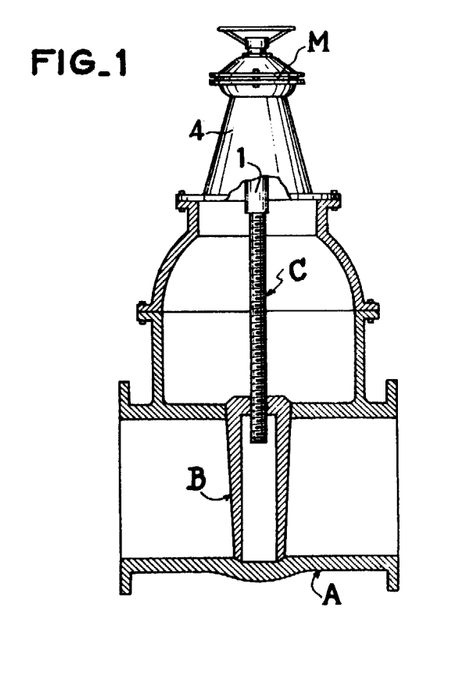
FIG. 1 is a diagrammatic view partly in section of a gate valve provided with a control device according to a first embodiment of the invention.

In the embodiment shown in FIG. 1, the invention is applied to the control or actuation, by a motor M, of a gate valve A whose closure member B is shifted by an actuating screw C which is disposed at the end of an actuating rod 1.

Figure 2:
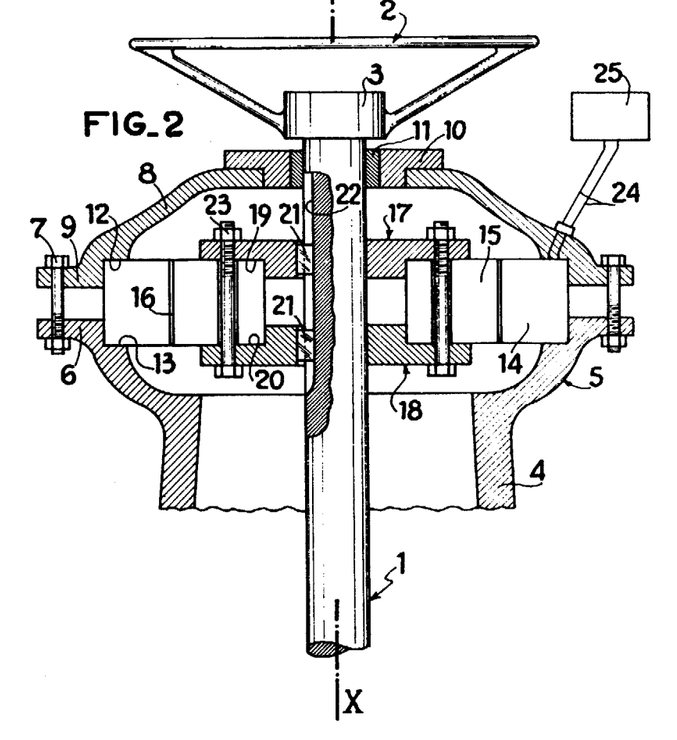
FIG. 2 is a diametral sectional view of this device.

As shown more precisely in FIG. 2, the actuating rod 1 having an axis X-X, which may be hollow if desired, is provided at its end remote from the closure member B with an actuating wheel or handwheel 2 whose hub 3 is keyed to the rod 1. The latter is located inside an iron housing 4 which is secured by a flange and bolts to the body or frame of the gate valve A. This housing 4 terminates at the end remote from the body in a portion 5 which has a dished-shaped inner surface defined by an outer flange 6. Secured to the housing 4 by suitable means, such as bolts 7, is a cup-shaped iron cap 8 having an outer flange 9. A centre opening is formed in the cap 8 and closed by a cover 10 which has an aperture containing a bushing 11 in which the rod 1 is journalled.

The flange 6 of the portion 5 of the housing 4 and the flange 9 of the cap 8 clamp therebetween a stator 14 of a variable reluctance electric motor, the flanges 6 and 9 having confronting inner shoulders 12 and 13 for this purpose. This general type of motor is well known in France under the name "Moteur a re luctance variable", a brief description of which is given in the French technical review "Ingenieurs de l'Automobile" No. 5, May 1971. Many French patents refer to this general type of motor by the same name, e.g. French Pat. No. 1,258,306. U.S. Pat. Nos. 2,295,286 and 2,589,999 also disclose electric motors relating to this general variable reluctance type. The expression "variable reluctance motor" employed herein and in the claims is intended to mean the general type of motor referred to in the foregoing references. Located inside the stator 14 of the motor, which stator is in the shape of a ring, is a rotor 15 which is also in the shape of a ring, the stator 14 and rotor 15 defining therebetween an airgap whose width is very small compared to the dimensions of the rotor 15. The latter is clamped between two steel annular support plates, or rotor carriers, namely an upper support plate 17 and a lower support plate 18 which have confronting shoulders 19 and 20 which bear against the rotor and which are both connected to rotate with the rod 1 by suitable connecting means, as keys 21 engaged in an axial slot or keyway 22 in the rod. The rotor 15 is held clamped between the plates 17 and 18 by for example bolts 23 and constitutes a rotor unit.

The device just described operates in the following manner:

When current is supplied to the stator 14 by the conductors 24 connected to a source of current 25, the rotor 15 is subjected to the action of the magnetic field and rotates the actuating rod 1. This rotation ceases as soon as the supply of current is cut off. The motor is preferably so constructed and dimensioned that a "vernier effect" is obtained, that is to say the actuating rod 1 can be rotated at low speed with a precision similar to that of a vernier.

The assembly coomprising the stator 14 and the rotor 15 therefore occupies a particularly small amount of space owing to the fact that the motor is disposed coaxially of the rod 1. There is no commutator, which requires frequent maintenance to avoid soiling, nor any speed reducer gearing as in the case of other d.c. or a.c. motors.

Figure 3:
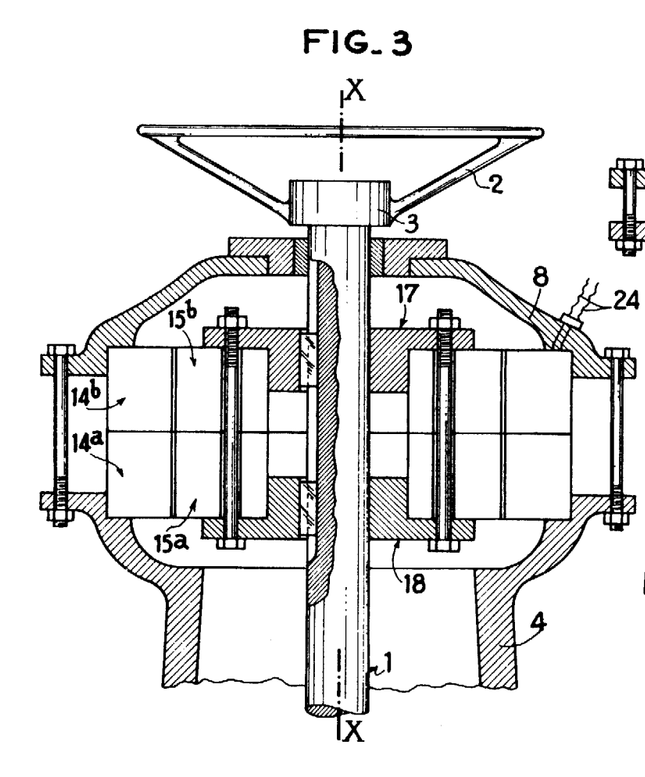
FIG. 3 is a view similar to FIG. 1 of a device according to a second embodiment of the invention.

Further, if the nominal torque of the motor unit is desired to be increased, it suffices to superimpose a plurality of identical motor units as shown in FIG. 3. Two stators 14a and 14b are for example interposed between the housing 4 and the cap 48 which are then spaced a greater axial distance apart than in the device shown in FIG. 1. Two rotors 15a and 15b are interposed between the support plates 17 and 18 which are also spaced a greater distance apart to the same extent and hold the two rotors clamped therebetween. It is thus clear that the mechanical parts, rotors and stators, which are moreover of particularly simple design, are the same for different powers of the motors which is highly advantageous in the construction of ranges of control apparatus.

Figure 4:
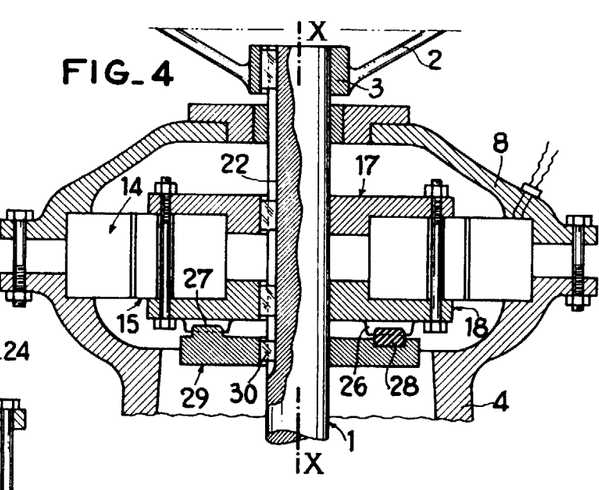
FIG. 4 is a view similar to FIG. 1 of a device according to a third embodiment of the invention.
Figure 5:
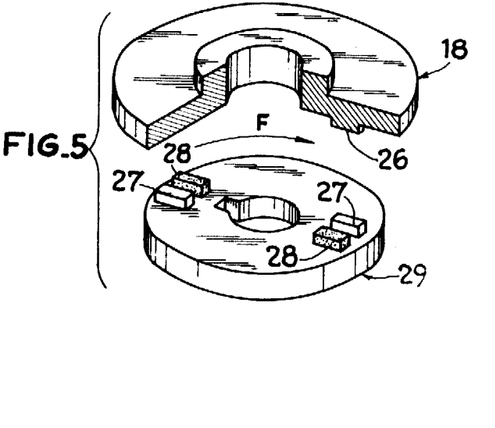
FIG. 5 is an exploded perspective view of a detail of the embodiment shown in FIG. 4.

The embodiment shown in FIGS. 4 and 5 is identical to that shown in FIG. 2 except that the lower support plate 18 of the rotor 15 has on the side thereof facing the closure member two bosses or radial teeth 26 which are diametrally opposed and have a substantially rectangular-sided shape and project axially from the support plate. Each of these bosses engage between two parallel corresponding radial bosses 27 and 28 which also have a substantially rectangular-sided shape and extend axially from an annular plate 29 which is for example of steel and is mounted on and keyed to the rod 1 by a key 30 which is engaged in the lower end of the groove or keyway 22. These bosses 27 and 28 perform the function of actuating or closure member-shifting abutments and are of different materials, the boss 27 being of the same material, for example steel, as the plate 29, and the other boss 28 being of a flexible or elastomeric material, such as natural or synthetic rubber or the like. The interengagement of the bosses 26, 27 and 28 and keys 21 and slot 22 is arranged to allow a slight angular play so that there is a limited lost motion between the assembly consisting of the plates 17 and 18 and the plate 29.

This device operates in the following manner:

When the closure member of the valve is to be closed, the rotor 15, the support plate 18, the plate 29 and the rod 1 rotate, for example, in the direction indicated by the arrow F in FIG. 5 until the closure member has reached its closing position. Thenceforth, a boss 26 bears against a boss 28 of flexible material which thus attenuates the reaction force of the valve rod. When opening, the moving assembly moves in the opposite direction of rotation.

However, it often occurs that the closure member jams. In this case, the variable reluctance motor, which supports being prevented from rotating notwithstanding the fact that it is supplied with current, vibrates. The vibrations are transmitted to the boss 26 which reciprocates slightly between the bosses 27 and 28. The boss of flexible material 28 absorbs the shock and then sends the boss 26 back against the boss 27 where, on the other hand, the shock is not elastically absorbed. The vibrations therefore perform the same function through the bosses as known complex devices which produce impact often termed "hammerblow" intended to release the jamming of the closure member.

These vibrations, which sometimes constitute a drawback in other applications of variable reluctance motors, are here employed to advantage. The effect would be identical if the support plates 17 and 18 were slidably keyed on the rod 1 to be prevented from rotating relative to the rod 1, since a slight play is sufficient between the rotor and these plates to allow the vibrations of the motor, whose rotor is prevented from rotating, for releasing the jamming of the closure member.

Figure 6:
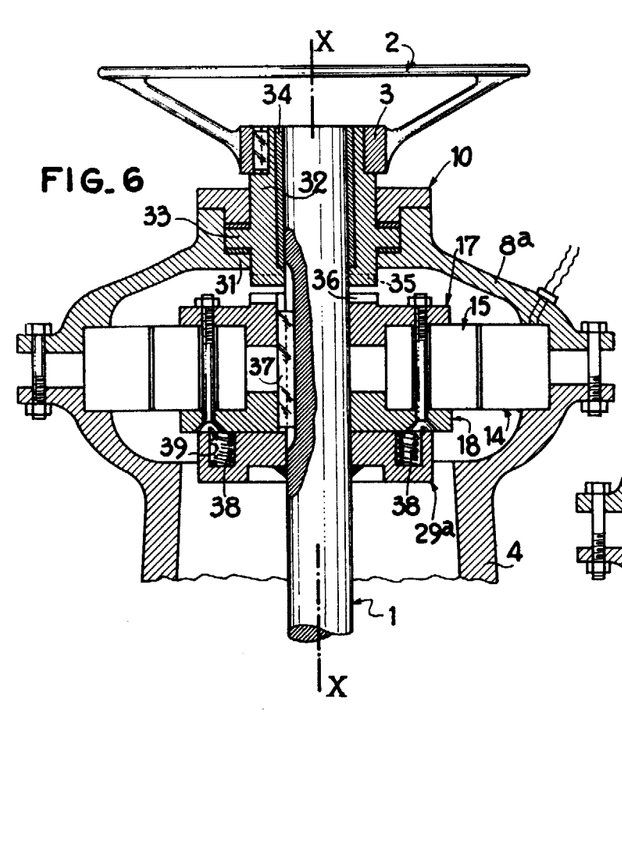
FIG. 6 is a view similar to FIGS. 2, 3 and 4 of a device according to a further embodiment of the invention.
Figure 7:
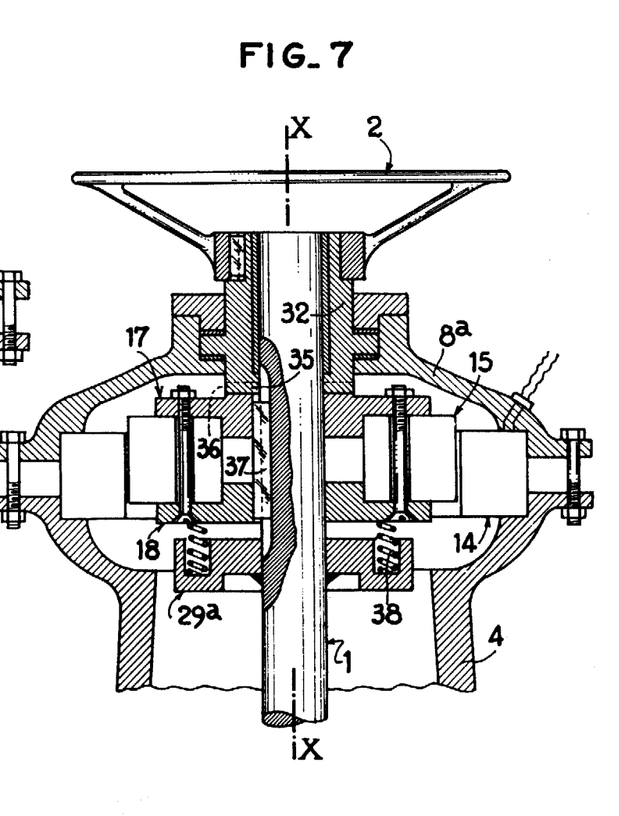
FIG. 7 is a view of the device shown in FIG. 6 in position for manual control.

The embodiment shown in FIGS. 6 and 7 is identical to that shown in FIG. 2 except that it is equipped with a disconnectible manual control which may be necessary for reasons of safety whereas in the embodiment shown in FIGS. 2–5, the wheel 2 rotates at the same time as the rod 1 when the latter is driven by the motor.

The rod 1 is again disposed inside the case 4 but the tap 8a has an inner annular flange 31 having the same inside diameter as the cover 10. A bronze sleeve 32 which has an outer flange 33 extends through the cover 10 and the flange 31 between which the flange 33 is disposed. The hub 3 of the wheel 2 is keyed to the sleeve 32 which is rotatably mounted on the rod 1 through a bushing 34. The lower end of the sleeve 32 has a plurality of clutch dogs or teeth 35 which constitute a toothed clutch and engage with dogs or teeth 36 correspondingly disposed on the upper surface of the support plate 17. The assembly comprising the rotor 15 and the support plates 17 and 18 is slidable along the rod 1 but is capable of rotating with the latter owing to the action of a key 37 common to the support plates or like means.

The movement in translation of the assembly comprising the rotor and support plates along the rod 1 is still further facilitated by springs 38 disposed in recesses 39 formed in a plate 29a which is similar to the plate 29 shown in FIGS. 4 and 5 but is here integral with the rod 1, for example welded to the latter. This plate 29a is fixed to the rod in such position that, when the springs 38 are compressed, and the support plate 18 is in contact with the plate 29a, the rotor 15 is exactly in alignment with the stator 14. Moreover, the support plate 18 and the plate 29a do not have bosses although these bosses may be provided, as will be explained hereinafter.

When the motor is not supplied with current, the rotor 15 and the support plates 17 and 18 are not subjected to the action of the springs 38 which have for effect to urge the assembly along the rod 1 so that the manual control is coupled by interengagement of the dogs 35 and 36 (FIG. 7). When, on the other hand, the motor rotates, the effect of minimum reluctance is such that the rotor 15 places itself exactly in alignment with the stator 14 by sliding along the rod 1 and compresses the springs 38 and disengages the dogs 35 and 36. The manual control is then uncoupled in the position shown in FIG. 6.

This particularly simple device therefore requires no locking. Moreover, the changing from manual control to electro-mechanical control occurs automatically merely by the application of the properties of variable reluctance motors.

The device shown in FIGS. 6 and 7 may also include, as the device shown in FIGS. 4 and 5, a group of bosses 26, 27 and 28 provided on the lower support plate 18 and the plate 29a so as to employ the vibrations produced for overcoming the jamming of the closure member. The sole difference resides in the fact that here the plate 29a is secured to the rod 1 whereas the support plates 17 and 18 are slidably keyed to this rod. It will be observed that by applying this phenomenon of the vibrations of the rotor to stop jamming of the closure member, the force furnished may be as much as for example four times higher than the nominal torque of the motor.

Variable reluctance motors have a great flexibility of utilisation; they may indeed rotate either in a continuous manner or step-by-step and they readily support different supply voltages.

Figure 8:
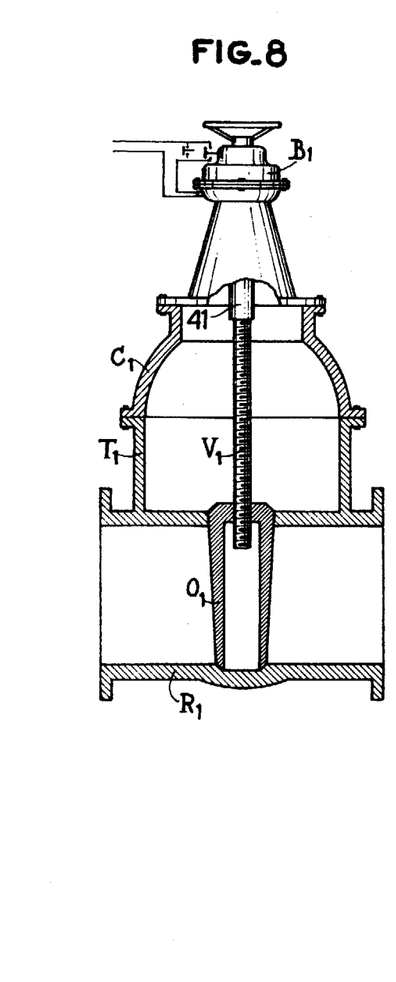
FIG. 8 is a diagrammatic assembly view partly in section of a gate valve provided with a control device according to a fifth embodiment of the invention.

The gate valve shown in FIG. 8 comprises a closure member O which is movable in a direction perpendicular to the axis of the passage through the valve body R and is shifted by an actuating screw V disposed inside a lateral tubular branch portion T of the body which is capped by a cap C surmounted by a housing B which contains the control device of the gate valve.

The actuating screw V having an axis X-X is integral with a hollow drive shaft 41 on which are mounted, coaxially with the shaft, a variable reluctance electric motor M and an actuating wheel or handwheel 42.

Figure 9:
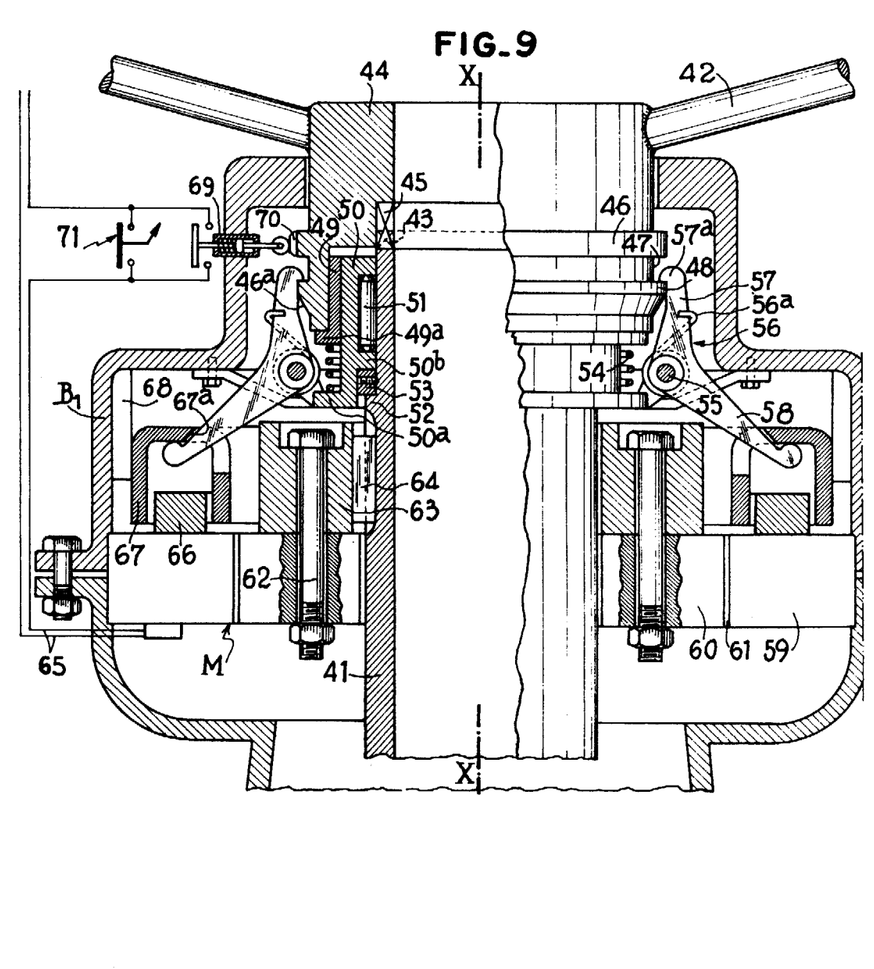
FIG. 9 is a sectional view, to an enlarged scale, of the device shown in FIG. 8 in the locked position for manual control.
Figure 10:
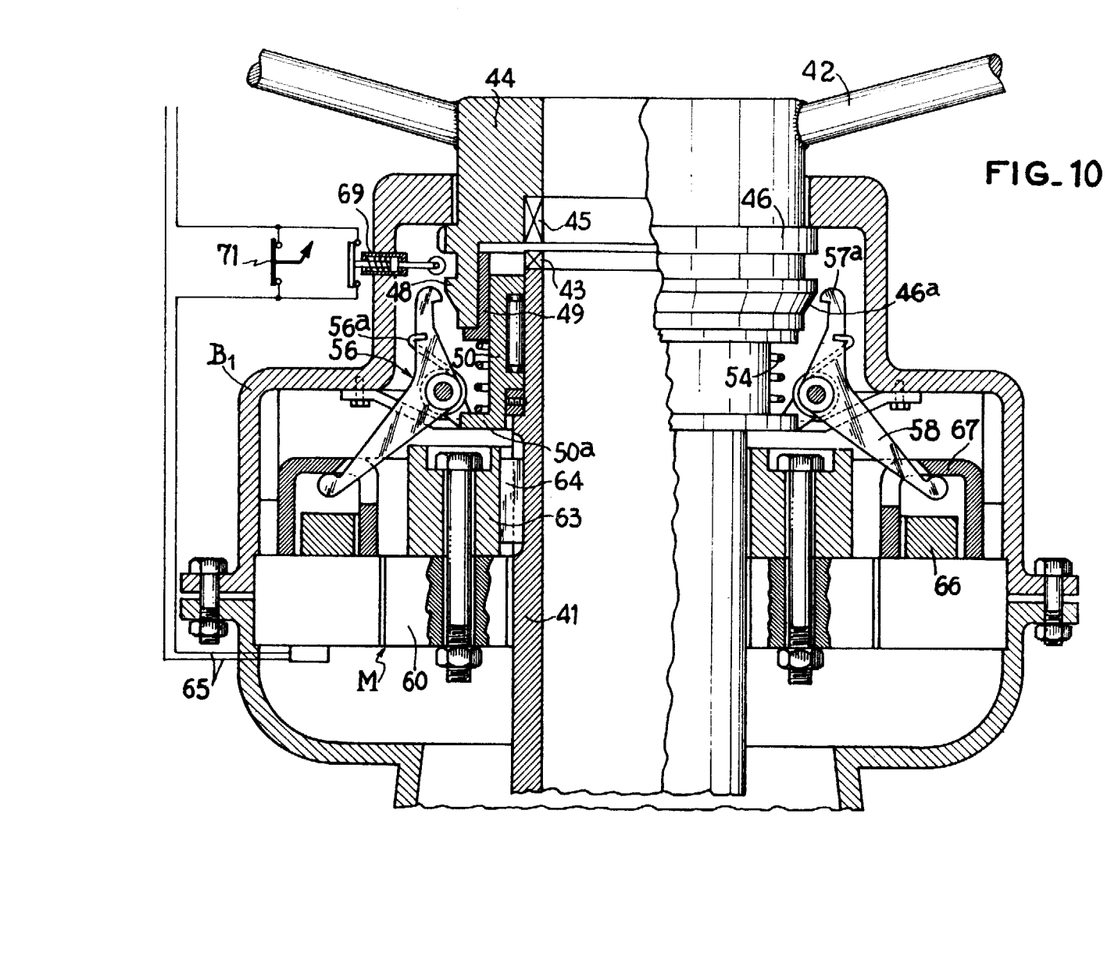
FIG. 10 is a view of the device shown in FIG. 9 in the position for electric control.

As shown in more detail in FIG. 9, the shaft 41 comprises at its end opposed to the screw, dogs or teeth 43 and the wheel 42 has a hub 44 provided with inner dogs 45 corresponding to the dogs 43 of the drive shaft. The hub 44 of the wheel is extended by a skirt 46 having a downwardly convergent frustoconical end portion 46a in which is formed an annular recess 47 which defines adjacent the end portion an annular hooking flange 48. Interposed between the skirt 46 of the wheel and the drive shaft 41 are two tubular members arranged on axis X-X, namely a bushing 49 slidably mounted in the skirt 46 and having a low coefficient of friction and defining at one end a flange 49a which bears against an end face of the skirt 46 and a sleeve 59 which is slidably mounted between the shaft 41 and the bushing 49 and terminates in a flange 50a which is secured to the housing B by radial tabs or lugs. The drive shaft 41 is freely journalled in the sleeve 50 for example by needle bearings 51. The sleeve 50 has an inner shoulder 50b through which the sleeve abuts an outer shoulder 52 on the shaft 41 with interposition of a thrust ring 53. A coil spring 54 on the axis X-X is compressed between the flange 49a and the flange 50a of the sleeve 50, the bushing 49 being axially slidable on the sleeve 50 in opposition to the action of this spring 54. The skirt 46 of the wheel 42 bears through its end face on the flange 49a of the bushing 49 and is therefore movable in axial translation along the shaft 41 between two positions, namely one in which the dogs 43 and 45 are interengaged (FIG. 9) and the other in which the dogs are disengaged (FIG. 10).

The sleeve 50 carries means for locking the wheel 42 in position for manual control. More precisely, the flange 50a of this sleeve carries pins 55 on which are pivotably mounted levers 56 having one branch 57 which extends toward the wheel 42 in a direction substantially parallel to the axis X-X and terminates in a locking or hooking nose 57a adapted to co-operate with the annular flange 48 of the skirt 46 and another branch 58 which extends downwardly and outwardly at 45° and is shifted by the variable reluctance motor M in a manner described hereinafter. The pins 55 are perpendicular to the axis X-X so that the levers 56 pivot in radial planes containing the axis X-X. A spring 56a, wound on the pin 55 of each lever 56, bears elastically against the branch 57 so as to bias the nose 57a into hooking engagement with the flange 48 of the skirt 46 of the wheel.

The variable reluctance motor M is disposed in the housing B below the flange 50a of the sleeve 50 and it comprises an annular stator 50 carried inside the housing B and an annular rotor 60 disposed inside the stator and spaced from the latter by an annular space or airgap 61. This rotor is freely rotatable about the drive shaft 41 and it is connected, for example by bolts 62, to move in the axial direction with a hub 63 which is keyed at 64 to the drive shaft 41, this hub being disposed between the flange 50a of the sleeve 50 and the rotor 60. Thus the rotor 60 is connected to rotate with the drive shaft 41 and is always engaged with the latter. The stator 59, which is supplied with current by conductors 65, has on the side thereof adjacent the wheel 42 means defining an annular projection 66 which constitutes a magnetic core for armature of this stator. This core co-operates with an annular magnetic armature 67 which has a U-section which is astride the projection 66 and bears on the end portions of branches 58 of the locking levers 56 owing to the provision of oblique openings 67a in this armature through which openings the branches extend. The armature 67 is adapted to actuate the levers in a direction for unlocking the flange 48. The armature 67 is movable in translation with respect to the magnetic core 66 and is guided in its movements by axial ribs 68 formed inside the housing B and having an active surface parallel to the axis X-X. The magnetic armature 67 moves toward or away from the magnetic core 66 depending on whether the variable reluctance motor is supplied or not supplied with current by the conductors 65.

The device operates in the following manner:

There will be described in succession normal operation with the electric control and the abnormal operation with the manual control.

As concerns the electric control which is illustrated in FIG. 10, when the motor M is started up, two cases can arise:

In one case, the manual control is not coupled and the hub 44 having the skirt 46 of the wheel 42 is biased by the spring 54 and the dogs 45 are thus disengaged from the dogs 43. Under the action of the spring 56a, each locking lever 56 is applied by its nose 47 on the frustoconical end portion 46a of the skirt 46. The magnetic armature 67 is separated from the magnetic core 66 by the branches 68 of the locking levers 56. When the motor M is supplied with current by the conductors 65, the armature 67 is attracted by the magnetic core 66 and each lever 56 is tilted to the position shown in FIG. 10. But there is no change in the manual control conditions since the wheel 42 is already uncoupled. The rotor 60 is started up and drives the shaft 41 through the hub 63 and the key 64.

In the other case, the manual control is coupled (position shown in FIG. 9) and the starting up of the motor M causes the armature 67 to move towards the magnetic core 66 which attracts it. The armature 67 thus acts on the end portion of the branch 58 of each lever 56 in opposition to the action of the spring 56a and causes each lever 56 to tilt and become unhooked from the flange 48 of the skirt 46. Under the action of the spring 54, the skirt 46, being no longer locked, is urged from the support constituted by the shoulder 52 of the shaft 51, the thrust ring 53 and the flange 50a of the sleeve 50. The dogs 45 are thus disengaged from the dogs 43 until they reach the position shown in FIG. 10. The rotor 60 of the motor M rotates the shaft 41.

When the shaft 41 is rotated by the motor M, it rotates freely with respect to the sleeve 50 owing to the needle bearing 51 and, optionally, owing to a thrust rolling bearing which may be combined with the thrust ring 53 and has not been shown in the drawing.

As concerns manual control of the valve by means of the wheel 42 illustrated in FIG. 9, two cases may also arise:

In one case, the wheel 42 is already in the coupled position shown in FIG. 9. It is then sufficient to rotate it to rotate the shaft 41 through the dogs 43 and 45. Note that, in the absence of a supply of current, the motor M permits this rotation without effort since the rotor 60 is capable of rotating freely with respect to the stator 59 from which it is separated by the airgap 61.

In the other case, the wheel 43 is in the uncoupled position shown in FIG. 10. In this case, the operator exerts an axial thrust on the wheel 42 in opposition to the action of the spring 54 which is compressed between the fixed flange 50a of the sleeve 50. The bushing 49 slides axially on the sleeve 50 with the skirt 46. The frustoconical end portion 46a of the skirt 46 against which the hooking noses 57a of the levers 56 are elastically applied urges back the noses 57a until the upper shoulder of the annular locking flange 48 of the skirt 46 is reached whereupon these noses 57 hook onto the flange 48. The wheel is thus locked in the manual control position and maintained therein by the springs 56a.

Note that the manual control ceases automatically by an automatic unlocking of the wheel 42 as soon as the motor M is supplied with current.

The control device according to the invention affords the following advantages among others:

Owing to the variable reluctance motor which permits the use of a projection 66 on the stator as a magnetic core and affords an uncoupling of the electric motor control owing to the airgap 61 when the motor is not supplied with current, the control is simplified since there are no means for uncoupling the motor and no means for actuating the unlocking means for the manual control.

Note also that the latter means for actuating the unlocking means constituted by the levers 56 are particularly simple and efficient since they employ the combination of a magnetic core 66 which is an integral part of the stator of the motor and the magnetic armature 67.

The locking means are very simple, strong and reliable in operation since they comprise pivoted levers having a hooking nose 57a.

The actuating wheel 42 is provided with a skirt 46 having a frustoconical end portion 46a which lends itself particularly well to the automatic engagement or hooking of the noses 57a of the levers 56 when the wheel 42 and its skirt 46 are axially depressed.

By way of a modification, if priority is given to manual control over the electric motor control, of if it is desired to afford a safety measure so as to preclude simultaneously starting up the motor M and rotating the wheel 42, for example accidentally, there may provided inside the housing B a switch 69 which co-operates with an annular projection 70 on the hub 44 of the wheel so as to cut off the supply to the motor M when the wheel 42 is axially depressed and locked in the manual control position (FIG. 9).

In order to start up the motor after automatically cutting off the supply by the switch 69, a shunt connection having a manual switch 71 is connected across the circuit 65 in parallel with the switch 69. Manual actuation of this switch 71 makes it possible to supply current to the motor notwithstanding the fact that the switch 69 is open and consequently makes it possible to bring about the procedure described hereinbefore of automatically unlocking the manual control as soon as the motor is once again supplied with current.

Figure 11:
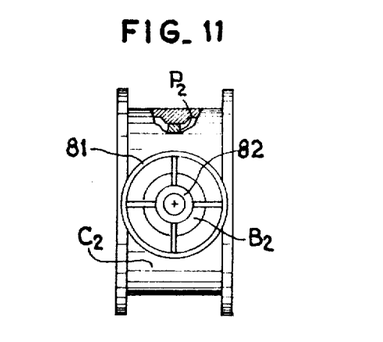
FIG. 11 is a side elevational view of a valve having a throttle or butterfly valve member provided with a control device which is a modification of the device shown in FIGS. 8-10.
Figure 12:
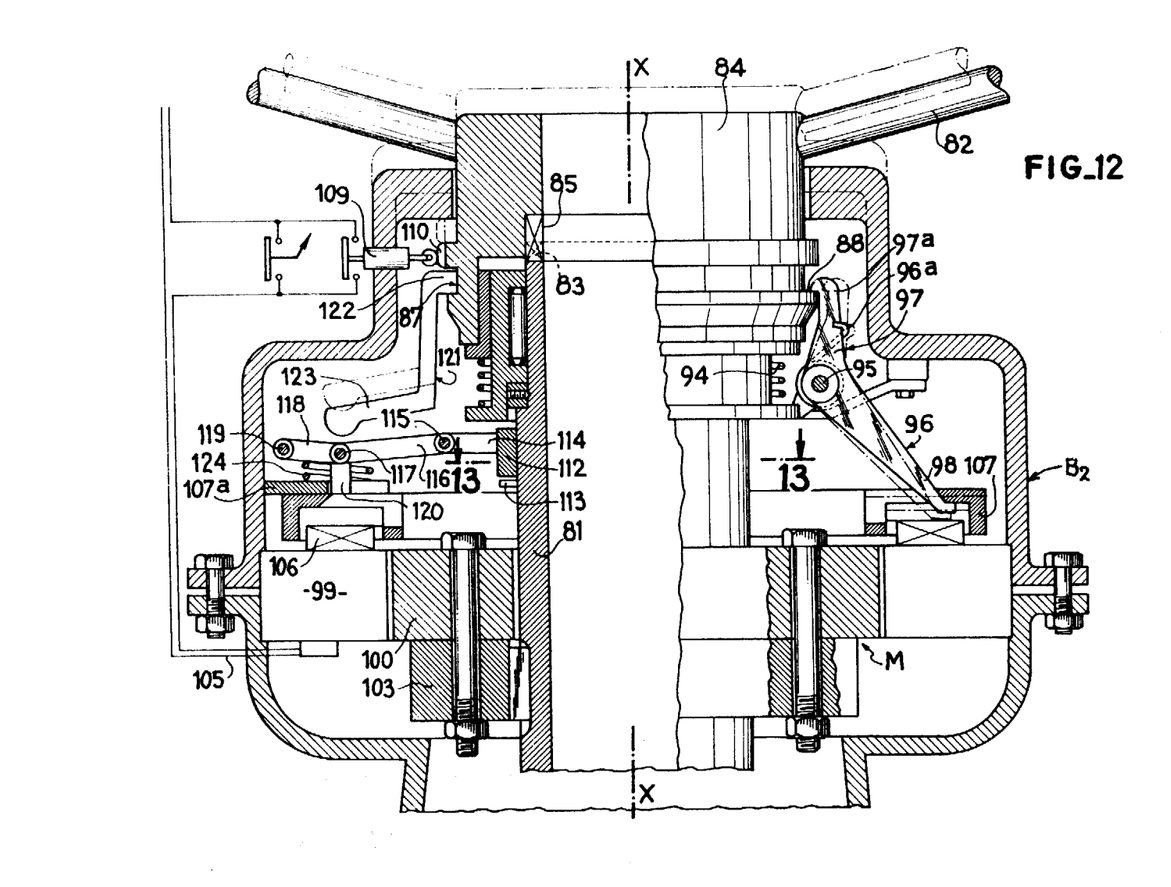
FIG. 12 is a diametral sectional view, to an enlarged scale, of the device shown in FIG. 11 in the position for manual control.

The valve shown in FIGS. 11 and 12 comprises a tubular body C, a rotary butterfly valve member P integral with a hollow shaft or actuating rod 91 having an axis X-X. This shaft can be rotated either by a variable reluctance electric motor M, coaxial with said shaft and disposed in a housing B integral with the body C, or by a manual control wheel 92 whose hub 84 is slidably mounted on the end of this shaft and can be connected to rotate therewith by depressing the wheel and engaging clutch dogs 83 and 85 in opposition to the action of a spring 94. The variable reluctance motor M comprises a stator 99 integral with the housing B and a rotor 100 keyed to the shaft 81 by a hub 103 disposed on the opposite side of the rotor to the wheel. An annular magnetic core 106, integral with the side of the stator 99 adjacent the wheel, is capable of attracting an annular U-sectioned magnetic armature 107 which is astride the core. The armature 107 is capable of pivoting toward the stator arms 98 of levers 96 which are disposed in three radial planes R which are spaced 120° apart and contain the axis X-X. The levers 96 are pivotably mounted on horizontal pivot pins 95 fixed with respect to the housing B whereas the other arms 97 of these levers have noses 97a which are capable of hooking on a flange 88 defined by a groove 87 in the hub 84 when the latter is axially engaged with the shaft 81. The noses 97a are capable of being released from the flange 88 when the armature 107 pivots the arms 98 in opposition to the action of springs 96a. A circuit 105 supplying current to the stator 99 comprises a switch 109 which opens this circuit under the action thereon of a cam 110 of the wheel 82 when the latter is axially engaged with the shaft 81. The control device described until now is thus substantially identical to that of the particular embodiment described with reference to FIG. 9.

Figure 13:
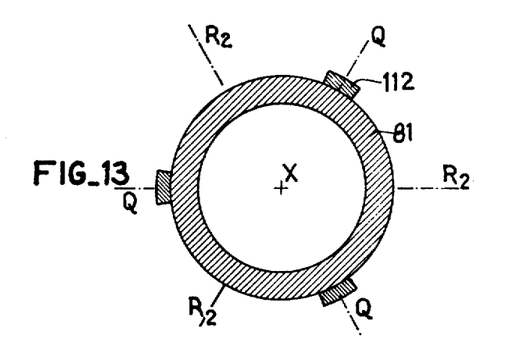
FIG. 13 is a sectional view, taken on line 13-13, of FIG. 12.

The device further comprises three brake shoes 112 disposed at the level of the lever arms 98 and at 120° to each other about the axis X-X in three radial planes Q which alternate with the radial planes R of the levers 96 (FIG. 13). These shoes 112 are guided axially of the shaft 81 by guides 113 integral with this shaft. By way of a modification, they may be guided in an annular groove provided in the shaft 81. They may be provided with friction elements or be ribbed or knurled and co-operate with complementary ribs or knurling provided on the shaft 81. Each shoe 112 is carried by an arm 114 which is oriented in the intended direction of displacement of the shoe, that is to say radial perpendicular with respect to the axis X-X. Pivoted to this support arm 114 by a pin 115 is one end of a link 116. At its other end this link 116 is pivoted by a pin 117 to one end of an arm 118 which is pivotably mounted at its other end on a pin 119 fixed to the housing B. Fixed to the pin 117 is a control rod 120 parallel to the axis X-X and integral with the annular armature 107. The assembly comprising the arm 114, the link 116, the arm 118 and the rod 120 associated with a shoe 112 is located in the radial plane Q corresponding to this shoe and the link 116 and the arm 118 are oriented in a direction substantially radial and perpendicular to the axis X-X when the armature 107 is shifted away from the core 106 into abutment against a ring 107a integral with the housing B. Also provided in each plane Q is a cranked lever 121 having a centre portion which is oriented substantially parallel to the axis X-X and whose end has an inner finger portion 122 which is permanently engaged in the groove 87 in the hub 84 but which is capable of turning in this groove about the axis X-X whereas at its other end the lever has an outwardly extending arm 123 whose end is located in front of the corresponding pin 117. A coil spring 124 is compressed between the fixed ring 107a and the pivotal connection between the link 116 and the arm 118. The levers 121 are dimensioned in such manner that when the wheel 82 is depressed and axially engaged with the shaft 81 (FIG. 12), a slight clearance exists between the end of the arms 123 and the pins 117.

The device just described operates in the following manner:

For electric control (FIG. 14), the electric motor M is supplied with current so that the magnetic armature 107 is attracted by the core 106 and drives along therewith the rods 120 which consequently shift the pins 117 and pivot the arms 118 and links 116 and compress the springs 124. The brake shoes 112 are thus moved away from the shaft 81 and therefore release the latter. Simultaneously, the noses 96a of the levers 96 are disengaged from the groove 87 (position of these levers 96a shown in dot-dash line in FIG. 12) and the unlocked wheel 82 is urged upwardly by the spring 94 and draws along therewith the levers 121 which thus move away from the pins 117 (position of these levers 121 shown in full line in FIG. 14 and dot-dash line in FIG. 12). The wheel is no longer axially engaged with the shaft 81 and it is the motor M which drives the latter.

Figure 14:
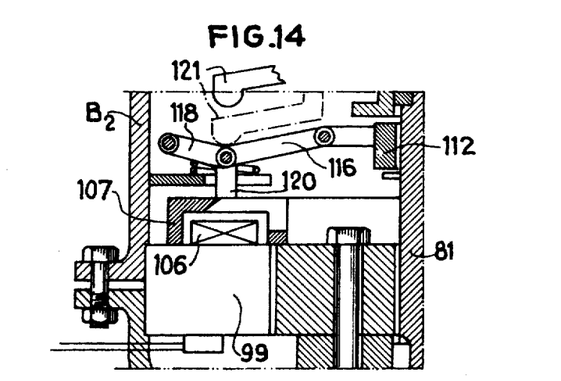
FIG. 14 is a partial view of the device shown in FIG. 12 in the position for electric control.

Upon stoppage after an electric control of the valve, the motor M has been cut out of circuit and the manual control is not engaged so that the butterfly valve member P could be subjected, in its position for opening the valve, to a rotational torque by the fluid which flows through the valve, this torque varying with the angle of opening of the butterfly valve and being maximum for a certain angle of opening. However, the butterfly valve member is prevented from rotating by the automatic locking of the shaft 81 as soon as the current supplied the stator is cut off, since the armature 110 is moved away from the core 106 under the action of the spring 124 and, as the hub 84 is in the upper position, the levers 121 are moved away from the pivotal connections between the members 16 and 18 so that the latter are subjected solely to the action of the springs 124. The shoes 112 are therefore applied against the shaft 81 with a great force resulting from the multiplication of the force exerted by the springs 124 by the leverage afforded by the links 116.

For manual control (FIG. 12), the electric motor M is cut out of circuit so that the movable armature 110 remains separated from the core 106. The wheel 82 is then depressed axially so as to engage it axially with the shaft 81 through the dogs 83 and 85. In this position it is locked by the levers 96 whose noses 97a hook on the flange 88. In this position (FIG. 12), a slight clearance exists between the levers 121 and the pins 117 so that the shaft remains locked by the shoes 112. In axially depressing the wheel 82 beyond this position the levers 121, which are axially displaced by the groove 87 of the wheel, exert a pressure on the pivotal connections 116, 118 and make them pivot and compress the spring 124. The brake shoes 112 are released from the shaft 81 (position of the levers 121 shown in dotted line in FIG. 14). Simultaneously the armature 107, axially shifted by the rods 120, unlocks the levers 96 from the flange 88. The manual control remains engaged by the dogs 83-85 but the axial thrust on the wheel 82 must be maintained to the full extent to rotate the wheel and the shaft 81 and thereby rotate the butterfly valve member. As soon as the actuation of the valve ceases and the wheel 82 is released axially, the hub 84 and the groove 87 rise and the pivotal connections 116-118 also rise under the effect of the springs 124 and the armature 107 rises and allows the hooking of the groove 87 by the noses 97a of the locking levers 96 (FIG. 12). The manual control is once more locked and the shaft 81 once more braked by the brake shoes 112.

An advantage of this structure, among others, is that both the action of the armature 107 and that of the wheel 82 through the levers 121 are put to use to release the brake shoes 112. This system of braking the shaft 81 is particularly advantageous and effective when the rotary closure member assembly has high inertia. It will be understood that this system may be made more progressive by the addition of dashpots to the return springs 124.

Having now described my invention, what I claim as new and desire to secure by Letters Patent is:

1. In a valve structure having a valve closure member, a frame attached to a body of the valve structure, an actuating member rotatable relative to the frame and combined with the valve closure member to shift the closure member between valve opening and valve closing positions upon rotation of the actuating member; wherein the improvement comprising for rotating the actuating member
    a. a variable reluctance motor having a stator fixed to the frame and an annular rotor rotatable within the stator;
    b. means connecting the rotor to the actuating member such that the rotor is coaxial with the actuating member and rotates therewith;
    c. the rotor defining with the actuating member an annular space in which space said connecting means extend;
    d. said rotor being combined with two annular support plates coaxial with and slidably keyed to the actuating member, the plates extending radially across said annular space and being in clamping engagement with the rotor, said connecting means connecting the support plates to the actuating member.

2. A valve structure as claimed in claim 1, wherein the motor comprises a plurality of stators and an equal number of rotors arranged in axially adjacent relation along the actuating member.

3. A valve structure as claimed in claim 1, wherein a limited rotational play is provided in said connecting means to enhance the effect of vibrations of the motor when jamming of the closure member prevents rotation of the actuating member.

4. A valve structure as claimed in claim 3, comprising a first plate which is fixed to the rotor and is annular and coaxial with the actuating member, a boss on said plate, a second annular plate coaxial with the actuating member and fixed on the actuating member in axially spaced relation to the first plate, and a second boss on the second plate for engagement by the boss on the first plate, said rotational play being defined by said connecting means and allowing said engagement between the bosses.

5. A valve structure as claimed in claim 3, comprising a first member connected to rotate with the rotor, a second member connected to rotate with the actuating member, one of the first and second members carrying in association with a first boss of the other of the first and second members two circumferentially adjacent bosses which are located on each side of the first boss of said other member, one of said adjacent bosses being of rigid material and the other of said adjacent bosses being of elastically yieldable material, said other of said adjacent bosses being positioned for engagement and deformation by said boss of said other of said first and second members when the rotor rotates in a direction to shift the closure member in a valve closing direction, said play being defined by said connecting means and allowing engagement between said first boss and said adjacent bosses.

6. In a valve structure having a valve closure member, a frame attached to a body of the valve structure, an actuatng member rotatable relative to the frame and combined with the valve closure member to shift the closure member between valve opening and valve closing positions upon rotation of the actuating member; wherein the improvement comprising for rotating the actuating member:
    a. a variable reluctance motor having a stator fixed to the frame and an annular rotor rotatable within the stator;
    b. means connecting the rotor to the actuating member such that the rotor is coaxial with the actuating member and rotates therewith;
    c. the rotor defining with the actuating member an annular space in which space said connecting means extend;
    d. and a manual closure member-actuating wheel and means for connecting the wheel to the actuating member on a side of the motor opposed to the closure member.

7. A valve structure as claimed in claim 4, further comprising a manual closure member-actuating wheel and second connecting means for connecting the wheel to the actuating member, the second connecting means having means for coupling the wheel to the actuating member and means for automatically locking said coupling means when changing to manual control and automatically unlocking said coupling means when the electric motor is supplied with current.

8. A valve structure as claimed in claim 7, wherein the coupling means are interposed between the wheel and the rotor of the motor and the locking means comprise elastically yieldable means which axially bias the rotor in opposition to an electromagnetic return force exerted on said rotor by the stator when the stator is supplied with current.

9. A valve structure as claimed in claim 8, comprising a sleeve which is mounted to be freely rotatable relative to the actuating member and is integral with the wheel, and the coupling means comprise a clutch having a clutch member which is held fast to the rotor and connected to rotate with the actuating member but axially slidable with respect to the actuating member, axially projecting clutch teeth carried by the sleeve and axially extending clutch teeth on the clutch member, the elastically yieldable means comprising an axially fixed element and springs which bear on the fixed element and bias said clutch member in the direction for engaging the clutch teeth, and cause the rotor to be axially offset from the stator.

10. A valve structure as claimed in claim 9, wherein said clutch member is one of two support plates in clamping engagement with the rotor.

* * * * *